Aug. 23, 1949.  A. W. ARNOLD  2,479,709
ARTICLE CONVEYING MECHANISM
Filed Nov. 27, 1943  2 Sheets-Sheet 1
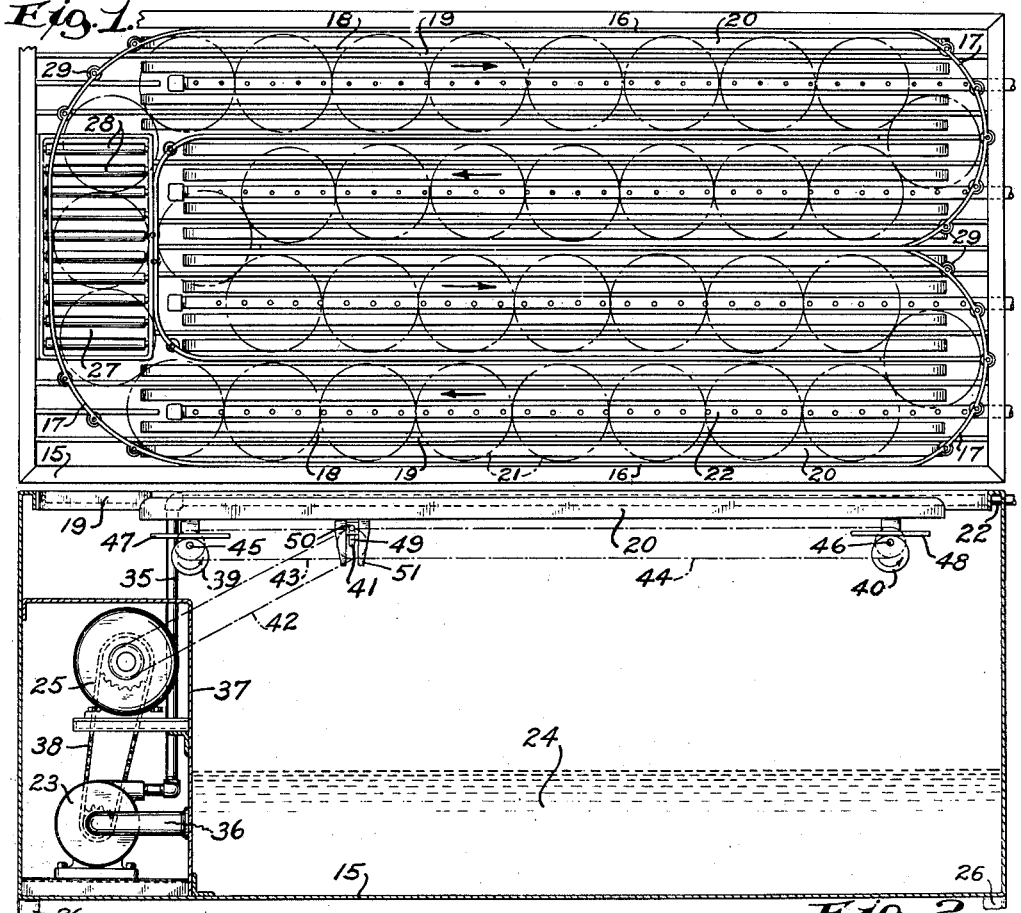
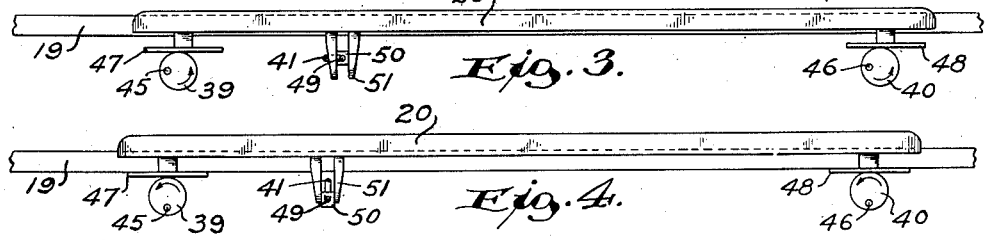
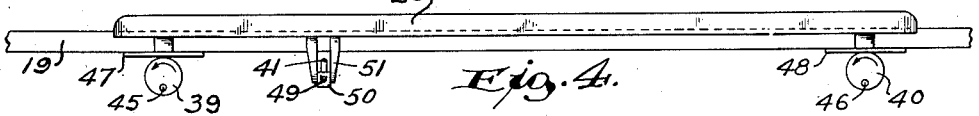
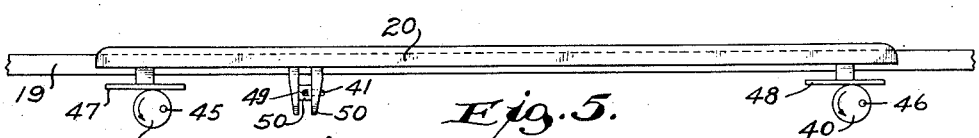
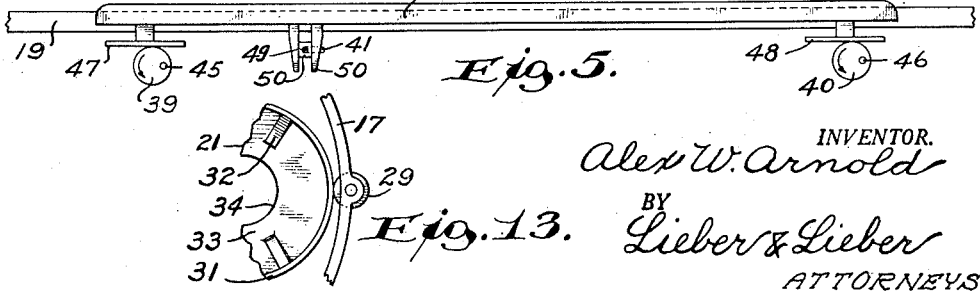

Aug. 23, 1949.   A. W. ARNOLD   2,479,709
ARTICLE CONVEYING MECHANISM
Filed Nov. 27, 1943   2 Sheets-Sheet 2
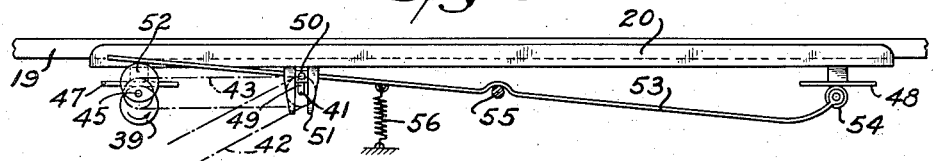
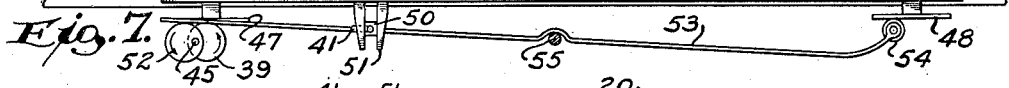
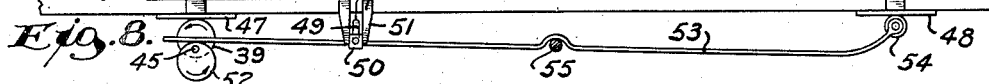
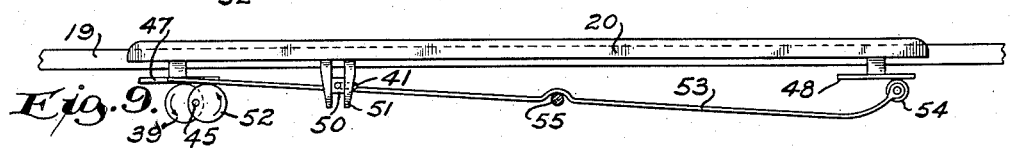
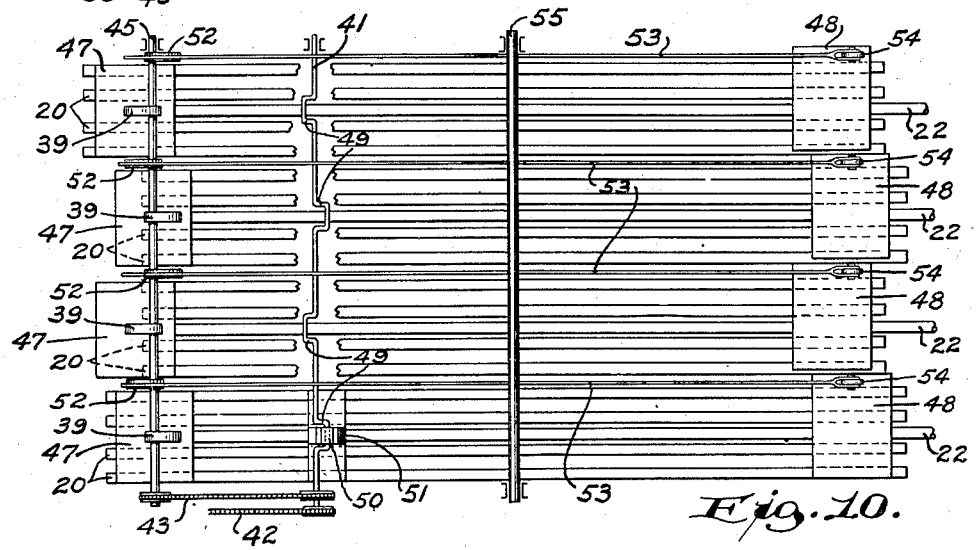
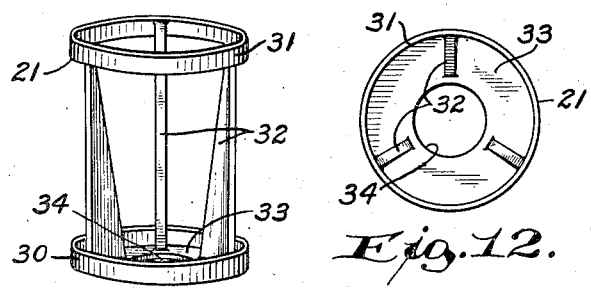
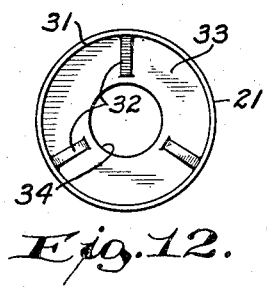
INVENTOR.
Alex. W. Arnold
BY
Lieber & Lieber
ATTORNEYS.

Patented Aug. 23, 1949

2,479,709

UNITED STATES PATENT OFFICE 2,479,709

ARTICLE CONVEYING MECHANISM

Alex W. Arnold, La Crosse, Wis.

Application November 27, 1943, Serial No. 511,919

6 Claims. (Cl. 198—219)

The present invention relates generally to improvements in the art of transferring diverse articles from place to place along a definite path, and relates more specifically to various improvements in the construction and operation of article conveying mechanisms, being a continuation in part of my copending application Serial No. 367,053, filed November 25, 1940 and issued as Patent No. 2,339,832 January 25, 1944.

The primary object of my present invention is to provide new and useful improvements in the construction of mechanisms for conveying a succession of articles along a definite path, while the articles may be subjected to various kinds of treatment.

A more specific object of the invention is to provide an improved step-by-step conveyor which is adapted to gently transport a contacting succession of relatively frail bodies along a predetermined route, in a positive and efficient manner.

Another specific object of this invention is to provide an improved mechanical conveyor for advancing a series of article carrier devices through a series of parallel zones in succession, and for ultimately returning the devices to the starting or loading zone.

A further specific object of the present invention is to provide an improved conveying system for constantly circulating an endless series of articles or carriers therefor, along a circuitous path with minimum power consumption and without danger of breaking relatively brittle articles.

Still another specific object of my invention is to provide an improved conveyor assemblage for quickly and effectively transporting a series of individual objects such as milk bottles through a succession of treating zones such as washing, rinsing and sterilizing chambers or the like.

An additional specific object of the invention is to provide various improvements in parallel bar or grid type conveyors for transferring diverse bodies from place to place by intermittent steps, whereby the construction thereof is simplified while the efficiency of operation is enhanced to a maximum.

These and other objects and advantages of this invention will be apparent from the following detailed description, and some of the improved features of conveyor construction shown but not specifically claimed in my co-pending application Serial No. 367,053, filed November 25, 1940, are being included herein.

A clear conception of the several features constituting the present improvement, and of the mode of constructing and of operating several types of conveyors embodying the invention, may be had by referring to the drawings accompanying and forming a part of this specification wherein like reference characters designate the same or similar parts in the various views.

Fig. 1 is a plan view of one of the improved article conveying mechanisms looking down upon the guiding structure and one type of conveyors and showing the endless series of article carriers in dot-and-dash lines;

Fig. 2 is a vertical section through the lower supporting casing of the conveying mechanism, showing the movable article advancing bars of the conveyor in lowermost position and also showing the chain drives in dot-and-dash lines;

Fig. 3 is a diagrammatic side elevation of the bar conveyor of Fig. 2, showing the movable bars in mid-position and toward the extreme right;

Fig. 4 is a similar diagrammatic side view of the same conveyor, showing the movable bars in uppermost position;

Fig. 5 is another similar view of the same conveyor, showing the movable bars in mid-position but toward the extreme left;

Fig. 6 is a diagrammatic side elevation of a modified bar conveyor embodying the invention, showing the movable article advancing bars in lowermost position and also showing the chain drives in dot-and-dash lines;

Fig. 7 is a similar view of the modified conveyor, showing the movable bars in mid-position and toward the extreme right;

Fig. 8 is another similar view of the modified conveying structure, showing the movable bars in uppermost position;

Fig. 9 is still another similar view of the modification, showing the movable bars in mid-position and toward the extreme left;

Fig. 10 is a diagrammatic bottom view of the modified conveyor assemblage, showing some of the elements displaced from actual position in order to avoid complication;

Fig. 11 is an enlarged perspective view of one of the improved article carriers;

Fig. 12 is a top view of the article carrier of Fig. 11; and

Fig. 13 is a fragmentary top view of one of the curved guides showing one of the anti-friction rollers thereof coacting with a passing article carrier.

While the improvement has been illustrated and described herein as being advantageously applicable to washers for simultaneously transporting and cleansing articles such as milk bottles while the bottles are disposed in inverted position within the endless series of carriers, it is not my desire or intention to thereby unnecessarily restrict the invention. It is also noteworthy, that either of the types of bar conveyors, one of which is shown in Figs. 2 to 5 inclusive, and the other of which is shown in Figs. 6 to 10 inclusive, may be utilized with equal advantage in conjunction with the improved article carriers and guiding structure without affecting the operation or utility of the carriers and guides.

Referring specifically to Figs. 1 to 5 inclusive, and Figs. 11, 12 and 13, the milk bottle conveying and washing assemblage shown therein, comprises in general a main support or lower casing 15 having upper guiding structure consisting of four parallel laterally spaced elongated sections 15 connected at their ends by curved sections 17 to provide a continuous circuitous article conducting path 18; several series of parallel elongated laterally spaced fixed bars 19 secured to the casing 15 and forming grid-like article supporting bottoms within the several straight sections of the path 18; a set of parallel elongated movable bars 20 operable within the spaces between the fixed bars 19 of each path section, so as to transport articles in succession along the path 18; an endless series of contacting article carrying cups or carriers 21 for inverted milk bottles or the like, filling the path 18 and resting either on the fixed bars 19 or on the movable bars 20 depending upon the position of the latter; elongated spray pipes 22 interposed centrally of the several rectilinear path sections and between the bars thereof; a pump 23 for circulating cleansing liquid through the spray pipes 22 from a liquid supply basin 24 within the casing 15; and common means such as an electric motor 25 for driving the pump 23, and for actuating the movable conveyor bars 20.

The main casing 15 may be formed of sheet metal or the like and may also be provided with suitable supporting legs 26 in order to bring the guiding structure and conveyor decks to desired height. The endless article conducting path 18 may also be provided with an end loading and unloading section 27 having parallel article supporting rollers 28 therein as shown in Fig. 1, and the curved upright guide sections 17 are preferably provided with disk rollers 29 near their lower ends, as shown in Figs. 1 and 13. The cups or carriers 21 which fill the path 18, as illustrated in dot-and-dash lines in Fig. 1, are preferably provided with lower annular rims 30 movable in the horizontal plane of and adapted to contact the successive rollers 29, as the cups are pushed around the curved path sections. While the cups or carriers may be of any desired shape depending upon the size and shape of the articles which they are intended to carry, the carriers 21 specifically shown are provided with upper rims 31 and with upright ribs 32 and a bottom 33 having a central hole 34 therein, in order that these carriers may support standard milk bottles in upright inverted position. The fixed perforated pipes 22 are positioned so as to deliver jets of liquid upwardly against and into the inverted bottles being transported along the path 18 by the carriers 21, and these spray pipes 22 may be connected to the discharge side or outlet of the pump 23 by piping 35 having suitable control valves therein, while the suction line 36 of the circulating pump 23 may be connected directly to the liquid supply basin 24 which is disposed to catch the liquid dropping from the advancing articles. The pump 23 and motor 25 may also be housed within the casing 15 in a separate chamber 37, and the pump 23 may be driven through a chain drive 38, as shown in Fig. 2.

As shown diagrammatically in Figs. 2 to 5 inclusive, the improved step-by-step conveying mechanism may consist of the fixed bars 19; the several sets of movable bars 20 which are operable in the adjacent elongated straight lane sections of the path 18; front and rear cams or eccentrics 39, 40 respectively for raising and lowering the movable bars 20 to parallel positions through the spaces between the fixed bars 19; a transverse crank shaft 41 for simultaneously reciprocating the movable bars 20 during their up and down movement; a chain drive 42 drivingly connecting the crank shaft 41 to the motor 25; and other chain drives 43, 44 connecting the crank shaft 41 with the eccentric supporting and driving shafts 45, 46 respectively, see also Fig. 1. As shown in Figs. 1 and 10, each set of movable bars is rigidly interconnected at its front and rear ends by means of lower transverse bearing plates 47, 48 respectively, and the eccentrics 39, 40 are constantly rotatable as indicated by the arrows, and coact with the plates 47, 48 respectively. In order to cause the carriers 21 within the successive and adjacent elongated straight path sections, to advance along these sections or lanes in opposite directions as indicated by the arrows in Fig. 1, the successive eccentrics 39, 40 on each shaft 45, 46, are of opposite throw, that is spaced 180° apart, and the eccentrics 39, 40 of each set are of like throw, see Figs. 1 and 10. The crank shaft 41 which simultaneously reciprocates the movable bars 20 must also reciprocate the successive and adjacent movable bar sets in opposite directions, and this crank shaft 41 is therefore provided with cranks 49 of opposite but equal throw, each of which coacts with guide elements secured to one or more of the movable bars 20 of the adjacent set through a slide block 50. The conveyor assemblage of Figs. 2 to 5 inclusive is therefore such that the movable bars 20 will be constantly alternately elevated and lowered by the eccentrics 39, 40 to positions above and below the upper surfaces of the adjacent fixed bars 19, and will be simultaneously longitudinally reciprocated by the cranks 49 of the constantly revolving crank shaft 41; and the movable bars in adjacent successive sets or lanes will be moving up and down and longitudinally in opposite directions at any predetermined moment, so as to advance the carriers 21 step-by-step along the circuitous path 18.

As shown diagrammatically in Figs. 6 to 10 inclusive, the modified improved step-by-step conveyor likewise consists of the fixed bars 19; the several sets of movable bars 20 which are operable in the adjacent elongated straight lane sections of the path 18; front and rear bearing plates 47, 48 rigidly inter-connecting the front and rear ends respectively of each of the several sets of movable bars 20; and a transverse crank shaft 41 for simultaneously reciprocating the movable bars 20, and having oppositely directed successive cranks 49 coacting through slide blocks 50 with guide elements 51 secured to one or more movable bars 20 of each set. The modified assemblage is however provided with modified means for alternately raising and lowering the bars 20 above and below the upper surfaces of the fixed bars 19; and while the front eccentric shaft 45 driven by a chain drive 43 and carrying eccentrics 39 coacting with the adjacent plates 47, are provided, for the purpose of raising and lowering the front ends of the movable bars 20, the shaft 45 is also provided with additional cams or eccentrics 52 of which there is one for each set of movable bars 20. Each of these eccentrics 52 is of opposite throw from that of an adjacent eccentric 39 cooperating with the same set of movable bars 20, and coacts with one end of a rocker lever 53 the opposite end of which carries a roller 54 coacting with the lower rear plate 48 of the same set of bars 20, as shown in Figs. 6 to 10 inclusive. The medial portions of all of the levers 53 are fulcrumed to swing upon a stationary transverse pivot shaft 55, and while the levers have been shown as being straight and disposed beyond the ends of the plates 47, 48 for the sake of clearness, they are in fact formed to clear the crank shaft 41 and are disposed beneath the plates 47, 48 in the actual machine. Any suitable means such as springs 56 may be provided for keeping the front ends of the levers 53 in contact with the eccentrics 52.

This modified conveyor assemblage is obviously such that the movable bars 20 will be constantly alternately elevated and lowered by the revolving eccentrics 39, 52 to parallel positions above and below the upper surfaces of the fixed bars 19, and they will always be moved to successive parallel positions by the direct coaction of the eccentrics 39 with the front plates 47, and by the coaction of the eccentrics 52 with the front ends of the levers 53 which swing on the shaft 55 and the rear ends of which coact through the anti-friction rollers 54 with the adjacent rear plates 48. The constantly revolving crank shaft 41 which constantly revolves the eccentrics 39, 52, also reciprocates the movable bars 20, and the movable bar sets in the adjacent lanes of the path 18 should again be moving up and down and longitudinally in opposite directions at any predetermined moment.

During normal operation of the improved bottle washer, the operator may be stationed near the loading and unloading zone 27, and while the major portion of the washing and rinsing path 18 may be provided with a suitable cover, the zone 27 should be open so as to permit free insertion and removal of the bottles into and out of the advancing carriers 21 which substantially fill the path 18 in order that the cups being transported along the straight lanes or path sections will push those located beyond these parallel lanes around the bends or curved path sections. The driving motor 25 when operating, will cause the pump 23 to constantly deliver washing liquid from the supply basin 24 through the spray pipes 22 in the form of upwardly directed jets, and this motor 25 will simultaneously drive the conveying mechanism through the chain drive 42. When either type of improved conveying mechanism is employed, the movable bars 20 of each of the straight path sections will be alternately raised and lowered while being simultaneously longitudinally reciprocated, and as these movable bars are raised above the adjacent fixed bars 19 and are moved longitudinally, they will lift and advance the bottle laden carriers 21 engaged thereby, by successive steps along the adjacent straight lanes of the path 18. Since the successive straight sections of the continuous circuitous path 18 are oppositely directed, the successive sections of the conveying mechanism must be constructed to advance the carriers 21 passing through these successive path sections in opposite directions. The endless series of article carriers 21 are thus positively advanced in step-by-step fashion through the successive rectilinear path sections, and the articles disposed therein are subjected to the spray jets delivered upwardly from the pipes 22, and the spent washing and rinsing liquid drains back into the basin 24 for re-use. As the successive cups or carriers 21 are pushed around the curved path sections which connect the adjacent ends of the straight path sections, they engage the anti-friction rollers 29, 28, thus reducing the frictional resistance and the power required to drive the conveyors.

It is to be noted that both of the improved types of conveying mechanisms act upon the carriers 21 in like manner, since in both types the movable bars 20 are raised and lowered to parallel positions with respect to the adjacent fixed bars 19, and are simultaneously longitudinally reciprocated by means of a constantly revolving crank shaft 41 having successive opposite throw cranks 49. The only difference between the two conveyor types, is the substitution of the levers 53 and rollers 54 of the modified type, for the rear eccentrics 40 of the other type, and this substitution of parts eliminates the chain drive 44 shown in Fig. 2. The modified type of conveyor may therefore be the preferred type, although either type may be utilized advantageously and both have proven highly successful and efficient in actual use. It is also to be noted that while the upright ribs 32 of the carriers 21 have been tapered so as to properly engage the tapered neck portions of inverted milk bottles, these carriers 21 may be of diverse shapes and sizes so as to cooperate with other kinds of articles, but these carrier cups should preferably substantially fill the path 18 in order to secure maximum capacity and to insure continuity of operation.

From the foregoing detailed description it will be apparent that my present invention provides an improved conveyor assemblage for diverse articles, which is extremely simple and compact in construction, and which is moreover highly efficient in operation and flexible in its adaptations. The improved step-by-step bar conveyors divided as shown into adjacent sections which cooperate with the successive parallel elongated lanes formed by the guide walls 16, and being operable to transport the articles in opposite directions through the successive sections of the endless path 18, provide means for rapidly and positively advancing the endless series of cups without danger of damaging the frail articles carried thereby. The anti-friction rollers 28, 29 located at the curved and transverse path sections, insure smooth guiding and transportation of the carriers 21 while also reducing the power consumption to a minimum, and the improved conveyor assemblage may obviously be utilized to transport various kinds of articles while the same are being subjected to diverse treatment. The improvements have proven highly successful and advantageous in actual use especially in connection with milk bottle washing equipment, and the machine has enormous capacity considering the space occupied and the small power consumption.

It should be understood that it is not desired to limit this invention to the exact details of construction or to the precise mode of operation and use, herein shown and described, for various modifications within the scope of the appended claims may occur to persons skilled in the art.

I claim:

1. In combination, a series of laterally spaced fixed bars, a similar series of bars movable through the spaces between said fixed bars above and below the upper surfaces of the latter, transverse end plates rigidly inter-connecting said movable bars near their opposite ends, a pair of opposite throw eccentrics simultaneously rotatable about a common axis beneath one of said plates, one of said eccentrics coacting directly with the adjacent plate to raise and lower the corresponding ends of said movable bars, a lever interposed between the other eccentric and the other plate and being operable to simultaneously raise and lower the movable bars to parallel positions, and a roller coacting with said other plate and being journalled upon the adjacent end of said lever.

2. In combination, a series of laterally spaced fixed bars, a similar series of bars movable through the spaces between said fixed bars above and below the upper surfaces of the latter, transverse end plates rigidly inter-connecting said movable bars near their opposite ends, a pair of opposite throw eccentrics simultaneously rotatable about a common axis beneath one of said plates, one of said eccentrics coacting directly with the adjacent plate to raise and lower the corresponding ends of said movable bars, and a medially fulcrumed lever having one swinging end coacting directly with the other eccentric and its other swinging end provided with a roller coacting directly with the other plate to simultaneously raise and lower said movable bars to parallel positions.

3. In combination, a series of laterally spaced fixed bars, a similar series of bars movable through the spaces between said fixed bars above and below the upper surfaces of the latter, transverse end plates rigidly inter-connecting said movable bars near their opposite ends, a pair of opposite throw eccentrics simultaneously rotatable about a common axis beneath one of said plates, one of said eccentrics coacting directly with the adjacent plate to raise and lower the corresponding ends of said movable bars, a medially fulcrumed lever having one swinging end movable up and down by the other eccentric and its opposite swinging end movable up and down beneath the other plate to simultaneously raise and lower the movable bars to parallel positions, and a roller interposed between said opposite lever end and the adjacent plate.

4. In combination, a series of laterally spaced fixed bars, a similar series of bars movable through the spaces between said fixed bars above and below the upper surfaces of the latter, transverse bearing elements rigidly inter-connecting the movable bar series near its opposite ends, a pair of opposite throw eccentrics simultaneously rotatable about a common axis beneath one of said connecting elements, one of said eccentrics coacting directly with the adjacent element to raise and lower the corresponding ends of said movable bars, a lever interposed between the other eccentric and the other connecting element and being operable to simultaneously raise and lower the movable bars to parallel positions, and anti-friction means coacting with said other element and being mounted upon the adjacent end of said lever.

5. In combination, a series of laterally spaced fixed bars, a similar series of bars movable through the spaces between said fixed bars above and below the upper surfaces of the latter, transverse bearing elements rigidly inter-connecting the movable bar series near its opposite ends, a pair of opposite throw eccentrics simultaneously rotatable beneath one of said bearing elements, one of said eccentrics coacting directly with the adjacent bearing element to raise and lower the corresponding ends of said movable bars, and a medially fulcrumed lever having one swinging end coacting directly with the other eccentric and its other swinging end provided with anti-friction means coacting directly with the other element to simultaneously raise and lower said movable bars to parallel positions.

6. In combination a series of laterally spaced fixed bars, a similar series of bars movable through the spaces between said fixed bars above and below the upper surfaces of the latter, transverse bearing elements rigidly inter-connecting the movable bar series near its opposite ends, a pair of opposite throw eccentrics simultaneously rotatable about a common axis beneath one of said bearing elements, one of said eccentrics coacting directly with the adjacent bearing element to raise and lower the corresponding ends of said movable bars, a medially fulcrumed lever having one swinging end movable up and down by the other eccentric and its opposite swinging end movable up and down beneath the other element to simultaneously raise and lower the movable bars, and anti-friction means interposed between said opposite lever end and the adjacent element.

ALEX W. ARNOLD.

REFERENCES CITED

The following references are of record in the file of this patent:

UNITED STATES PATENTS

| Number | Name | Date |
|---|---|---|
| 337,863 | Petrie et al. | Mar. 16, 1886 |
| 597,838 | Castle | Jan. 25, 1898 |
| 872,856 | Spence | Dec. 3, 1907 |
| 874,330 | Groom | Dec. 17, 1907 |
| 942,514 | Palmowsky | Dec. 7, 1909 |
| 1,400,367 | McCann | Dec. 13, 1921 |
| 1,501,135 | Picht | July 15, 1924 |
| 1,686,122 | Brennan | Oct. 2, 1928 |
| 1,880,112 | Shmyroff et al. | Sept. 27, 1932 |
| 1,954,372 | Tucker | Apr. 10, 1934 |
| 2,331,540 | Dilling | Oct. 12, 1943 |
| 2,339,832 | Arnold | Jan. 25, 1944 |

FOREIGN PATENTS

| Number | Country | Date |
|---|---|---|
| 301,700 | Great Britain | Dec. 6, 1928 |